US012664090B2

(12) United States Patent
Kragel et al.

(10) Patent No.: US 12,664,090 B2
(45) Date of Patent: Jun. 23, 2026

(54) DYNAMIC GARBAGE COLLECTION OPERATIONS

(71) Applicant: Sandisk Technologies, Inc., Milpitas, CA (US)

(72) Inventors: Oleg Kragel, San Jose, CA (US); Chaoyang Wang, San Ramon, CA (US); Hongmei Xie, Sunnyvale, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 153 days.

(21) Appl. No.: 18/448,261

(22) Filed: Aug. 11, 2023

(65) Prior Publication Data

US 2024/0264936 A1 Aug. 8, 2024

Related U.S. Application Data

(60) Provisional application No. 63/483,613, filed on Feb. 7, 2023.

(51) Int. Cl.
*G06F 12/02* (2006.01)

(52) U.S. Cl.
CPC .............................. *G06F 12/0253* (2013.01)

(58) Field of Classification Search
CPC ......... G06F 12/0253; G06F 2212/7203; G06F 12/0246; G06F 2212/7205
See application file for complete search history.

(56) References Cited

U.S. PATENT DOCUMENTS

| | | | |
|---|---|---|---|
| 9,569,352 B2 | 2/2017 | Marcu et al. | |
| 10,747,663 B2 | 8/2020 | Yoshii et al. | |
| 11,200,003 B2 | 12/2021 | Hutchison et al. | |
| 2008/0034174 A1* | 2/2008 | Traister | G06F 12/0246 |
| | | | 711/159 |
| 2017/0068451 A1 | 3/2017 | Kenan et al. | |
| 2018/0307599 A1 | 10/2018 | Tamura | |
| 2019/0073140 A1* | 3/2019 | Yamada | G06F 3/0679 |
| 2020/0133898 A1* | 4/2020 | Therene | G06F 13/1668 |
| 2021/0216239 A1* | 7/2021 | Dutta | G06F 3/0658 |
| 2023/0143181 A1* | 5/2023 | Tan | G06F 3/0656 |
| | | | 711/103 |
| 2023/0393750 A1* | 12/2023 | Huang | G06F 3/0611 |

* cited by examiner

*Primary Examiner* — Nanci N Wong
(74) *Attorney, Agent, or Firm* — Michael Best & Friedrich LLP

(57) ABSTRACT

Devices, methods and apparatuses for dynamically enabling and disabling garbage collection operations during periods of burst in host command activity. Host command latency is monitored during operation of a data storage device. During normal operation, host data is stored in host blocks in a memory of the data storage device. During periods of burst, the host command latency may increase above a garbage collection disable threshold. In response, an electronic processor disables garbage collection operations. Additionally, during this time, host data is stored in buffers in the memory of the data storage device. When the host command latency decreases below a garbage collection enable threshold, the data storage device returns to normal operation and enables garbage collection operations.

17 Claims, 5 Drawing Sheets

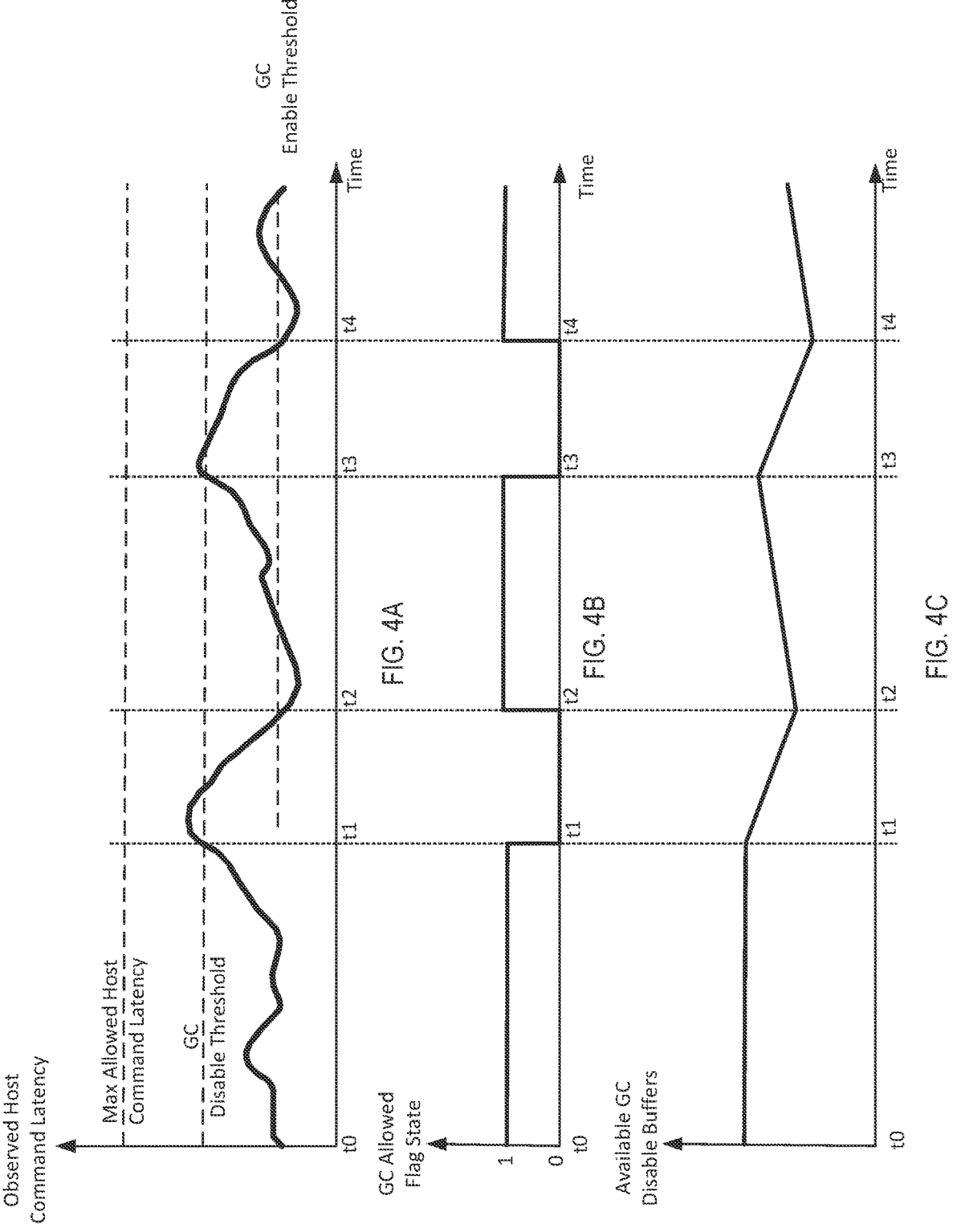

DYNAMIC GARBAGE COLLECTION OPERATIONS

CROSS-REFERENCE TO RELATED APPLICATION

This application claims priority to and the benefit of U.S. Provisional Patent Application No. 63/483,613, filed on Feb. 7, 2023, the entire contents of which is incorporated herein by reference.

FIELD

This application relates generally to data storage devices and, more particularly, to dynamic garbage collection operations in data storage devices during periods of heavy workload.

SUMMARY

Data storage devices store host data received from a host device within memory of the data storage device. Host commands may include both short and long commands and include host data to be stored in the memory of the data storage device. During write operations, the data storage device may experience a sudden burst of received host commands, each host command requiring time to perform the indicated operation, including writing host data to memory. As the burst of host commands continues, the latency for storing the host data may increase, resulting in an increased time delay between receiving host commands and performing host commands.

Additionally, as the memory stores an increasing amount of host data during the burst of host commands (e.g., the period of heavy workload), garbage collection (GC) operations may be triggered to relocate (or move) already stored host data from old and closed memory blocks to newly opened memory blocks, resulting in consolidation of data to free memory blocks that are ready for storing new host data. These GC operations further increase the latency for performing host commands and impact the overall quality of service (QoS) of the data storage device. Accordingly, embodiments described herein provide for dynamically disabling garbage collection processes to assist the data storage device in handling bursts of traffic.

The disclosure provides a data storage device including, in one embodiment, a memory interface and an electronic processor. The memory interface is configured to interface with a non-volatile memory, the non-volatile memory including a plurality of memory blocks. The electronic processor is configured to receive a host command including host data to store in the plurality of memory blocks and perform the host command. The electronic processor is configured to determine whether a host command latency is greater than or equal to a first threshold and disable garbage collection operations of the data storage device when the host command latency is greater than or equal to the first threshold.

The disclosure also provides a method for dynamic garbage collection operations. In one embodiment, the method includes receiving a host command including host data to store in a plurality of memory blocks of a data storage device and performing the host command. The method includes determining whether a host command latency is greater than or equal to a first threshold and disabling garbage collection operations of the data storage device when the host command latency is greater than or equal to the first threshold.

The disclosure also provides an apparatus. The apparatus includes a means for interfacing with a non-volatile memory, the non-volatile memory including a plurality of memory blocks. The apparatus includes a means for receiving a host command including host data to store in a plurality of memory blocks, and a means for performing the host command. The apparatus includes a means for determining whether a host command latency is greater than or equal to a first threshold. The apparatus includes a means for disabling garbage collection operations of the data storage device when the host command latency is greater than or equal to the first threshold.

In this manner, various aspects of the disclosure provide for improvements in at least the technical fields of data storage devices and their design and architecture. The disclosure can be embodied in various forms, including hardware or circuits controlled by firmware (i.e., code executing on a processor), and computer systems and networks; as well as hardware-implemented methods, signal processing circuits, memory arrays, application specific integrated circuits, field programmable gate arrays, and the like. The foregoing summary is intended solely to give a general idea of various aspects of the disclosure, and does not limit the scope of the disclosure in any way.

BRIEF DESCRIPTION OF THE DRAWINGS

FIG. 4A is a graph illustrating host command latency over time, in accordance with another embodiment of the disclosure.

FIG. 4B is a graph illustrating a flag state associated with the graph of FIG. 4A.

FIG. 4C is a graph illustrating available buffers associated with the graph of FIG. 4A.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the memory device may be performed by hardware (e.g., analog or digital circuits), a combination of hardware and software (e.g., program code or firmware, stored in a non-transitory computer-readable medium, that is executed by processing or control circuitry), or any other suitable means. The following description is intended solely to give a general idea of various aspects of the disclosure, and does not limit the scope of the disclosure in any way.

Data Storage Devices

Figure 1:
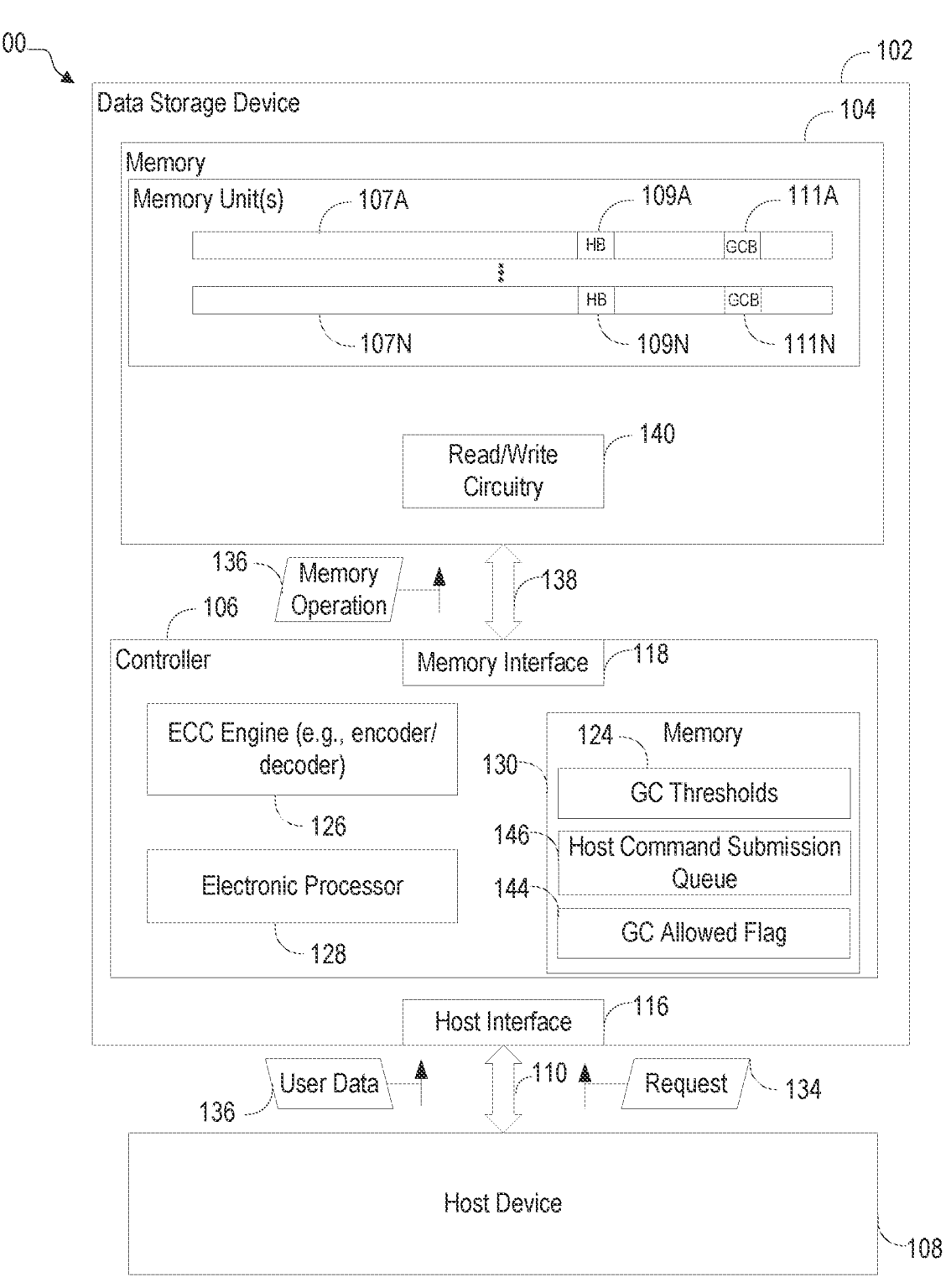
FIG. 1 is block diagram of a system including a data storage device, in accordance with some embodiments of the disclosure.

FIG. 1 is a block diagram of one example of a system 100 that includes a data storage device 102. In some implementations, the data storage device 102 is a flash memory device. For example, the data storage device 102 is a Secure Digital SD® card, a microSD® card, a solid-state drive within or connected to a computer, or another similar type of data storage device. The data storage device 102 illustrated in FIG. 1 includes a memory 104 (e.g., a non-volatile memory) and a controller 106 (referred to hereinafter as "data storage device controller") coupled to the memory 104.

The data storage device 102 is coupled to a host device 108. The host device 108 is configured to provide data 110 (for example, user data 136) to the data storage device 102 to be stored, for example, in the memory 104. The host device 108 is, for example, a smart phone, a music player, a video player, a gaming console, an e-book reader, a personal digital assistance device, a tablet, a notebook computer, or another similar device.

In some implementations, the memory 104 is NAND flash memory. The memory 104 illustrated in FIG. 1 includes a plurality of memory units 107A-107N (for example, flash memory units). Each of the plurality of memory units 107A-107N includes a plurality of storage elements. For example, in FIG. 1, the memory unit 107A includes first representative storage elements 109A-109N and second representative storage elements 111A-111N. In some implementations, the storage element 109 is a multi-level cell flash memory, such as a 2 levels cell ("SLC"), a 4 levels cell ("MLC"), an 8 levels cell ("TLC"), a 16 levels cell ("QLC"), or a flash memory cell having a larger number of bits per cell (for example, between five and ten bits per cell). In some implementations, the plurality of memory units 107A-107N are memory dies configured to store data. In such implementation, each storage element 109 may be a block of memory. Additionally, storage elements may be configured to store particular types of data, or may be configured to store data only during particular operations. For example, in FIG. 1, the first representative storage elements 109A-109N are host blocks configured to store host data, and the second representative storage elements 111A-111N are GC buffers, described below in more detail. In another example, the GC buffers may be stored within the memory 130 (described below in more detail).

The data storage device controller 106 illustrated in FIG. 1 includes a host interface 116, a memory interface 118, an error code correction (ECC) engine 126, and an electronic processor 128. The data storage device controller 106 is illustrated in FIG. 1 in a simplified form. One skilled in the art would recognize that a controller for a non-volatile memory would include additional modules or components other than those specifically illustrated in FIG. 1. Additionally, although the data storage device 102 is illustrated in FIG. 1 as including the data storage device controller 106 and modules for performing, for example, flag setting, in other implementations, the data storage device controller 106 is instead located within the host device 108 or is otherwise separate from the data storage device 102. As a result, flash translation layer ("FTL") operations and flash module ("FM") operations that would normally be performed by the data storage device controller 106 (for example, wear leveling, bad block management, data scrambling, garbage collection, address mapping, etc.) can be performed by the host device 108 or another device that connects to the data storage device 102.

The data storage device controller 106 is configured to send data to, and receive data and instructions from, the host device 108 with the host interface 116. The host interface 116 enables the host device 108 to, for example, read from the memory 104 by transmitting requests 134 and to write to the memory 104 by sending user data 136 and using any suitable communication protocol. Suitable communication protocols include, for example, the Universal Flash Storage ("UFS") Host Controller Interface specification, the Secure Digital ("SD") Host Controller specification, etc.

The data storage device controller 106 is also configured to send data and commands to (e.g., the user data 136, the requests 134), and receive data from, the memory 104 with the memory interface 118. As an illustrative example, the data storage device controller 106 is configured to send data and a write command to instruct the memory 104 to store data in a particular memory location in the memory 104. The data storage device controller 106 is also configured to send a read command to the memory 104 to cause a read of data from a particular memory location in the memory 104. In some examples, the data storage device controller 106 is coupled to the non-volatile memory 104 with a bus 138 in combination with the memory interface 118.

The data storage device controller 106 illustrated in FIG. 1 includes an electronic processor 128 (for example, a microprocessor, a microcontroller, a field-programmable gate array ["FPGA"] semiconductor, an application specific integrated circuit ["ASIC"], or another suitable programmable device) and a non-transitory computer readable medium or memory 130 (for example, including random access memory ["RAM"] and read only memory ["ROM"]). The electronic processor 128 is operatively connected to the various modules within the data storage device controller 106 and the data storage device 102. For example, firmware is loaded in a ROM of the memory 130 as computer executable instructions. Those computer executable instructions are capable of being retrieved from the memory 130 and executed by the electronic processor 128 to control the operation of the data storage device 102 and perform the processes described herein (for example, flag setting and read operations). In some implementations, one or more modules of the data storage device controller 106 correspond to separate hardware components within the data storage device controller 106. In other implementations, one or more modules of the data storage device controller 106 correspond to software stored within the memory 130 and executed by the electronic processor 128. The memory 130 is configured to store data used by the electronic processor 128 during operation. For example, the memory 130 stores GC thresholds 124 (for example, a GC enable threshold and a GC disable threshold), a GC allowed flag 144, and a host command submission queue 146, as described below in more detail.

Host Command Latency Mitigation

Figure 2:
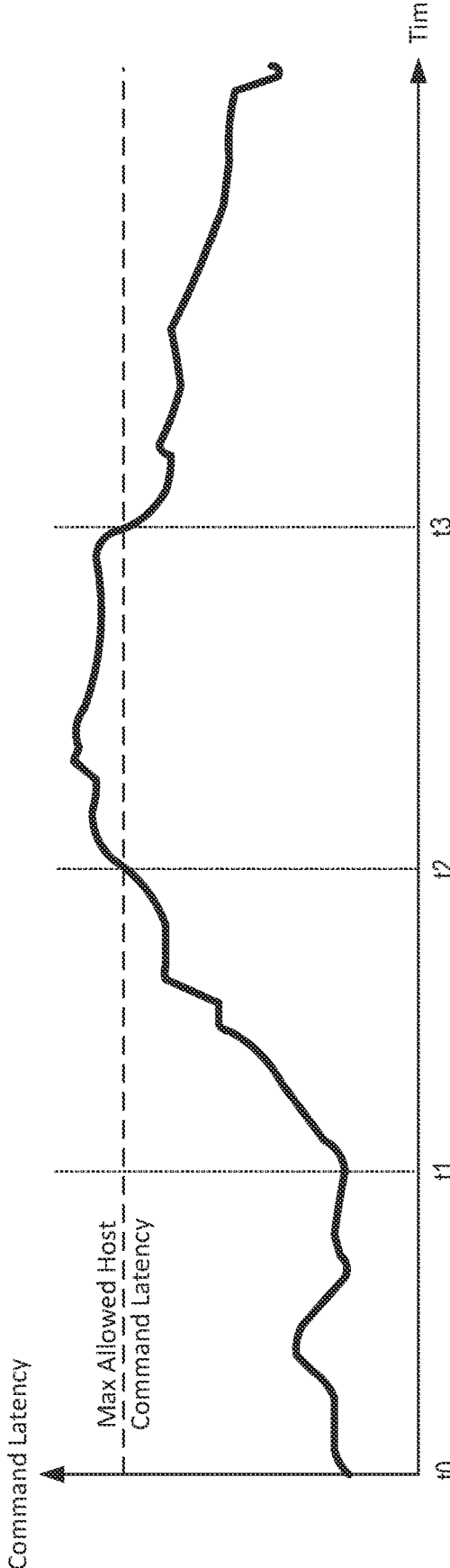
FIG. 2 is a graph illustrating host command latency over time, in accordance with one embodiment of the disclosure.

In some implementations, as host commands are received by the data storage device 102, the host commands are stored in the host command submission queue 146 prior to being performed. As host commands are performed, they are removed from the host command submission queue 146. One example of a host command is a command to store host data in the memory 104. In such an example, host command may include the host data and instructions for storing the host data. During periods of heavy workload, the latencies observed by the data storage device 102 are elevated as more host commands are in the host command submission queue 146. For example, FIG. 2 provides an example graph 200 illustrating example host command latency over time. From time t0 to t1, the host command latency (e.g., the time from receiving a host command to performing the host command)

observed by the data storage device 102 is relatively constant. However, at time t1, a period of heavy workload begins and the host command latency observed by the data storage device 102 increases.

When the data storage device 102 continues to receive host commands faster than the host commands can be performed, the observed host command latency continues to increase. In some instances, the host command latency may exceed a maximum allowed host command latency (for example, from time t2 to time t3). Should the maximum allowed host command latency be exceeded, the QoS of the data storage device 102 may be drastically reduced compared to normal operation, interrupting user experience of the data storage device 102.

Embodiments described herein reduce the observed host command latency by disabling GC operations during periods of increased host command receipt. When GC operations are enabled, a GC operation may be triggered when only a predetermined number of host blocks 109A-109N are available (for example, ten host blocks remain). When performing the GC operation, the electronic processor 128 relocates old host data from the plurality of host blocks 109A-109N, increasing the number of available host blocks 109A-109N. Disabling GC operations allows the controller 106 to prioritize storing host data to buffers (such as the GC buffers 111A-111N) rather than relocating data stored by host blocks 109A-109N.

Figure 3:
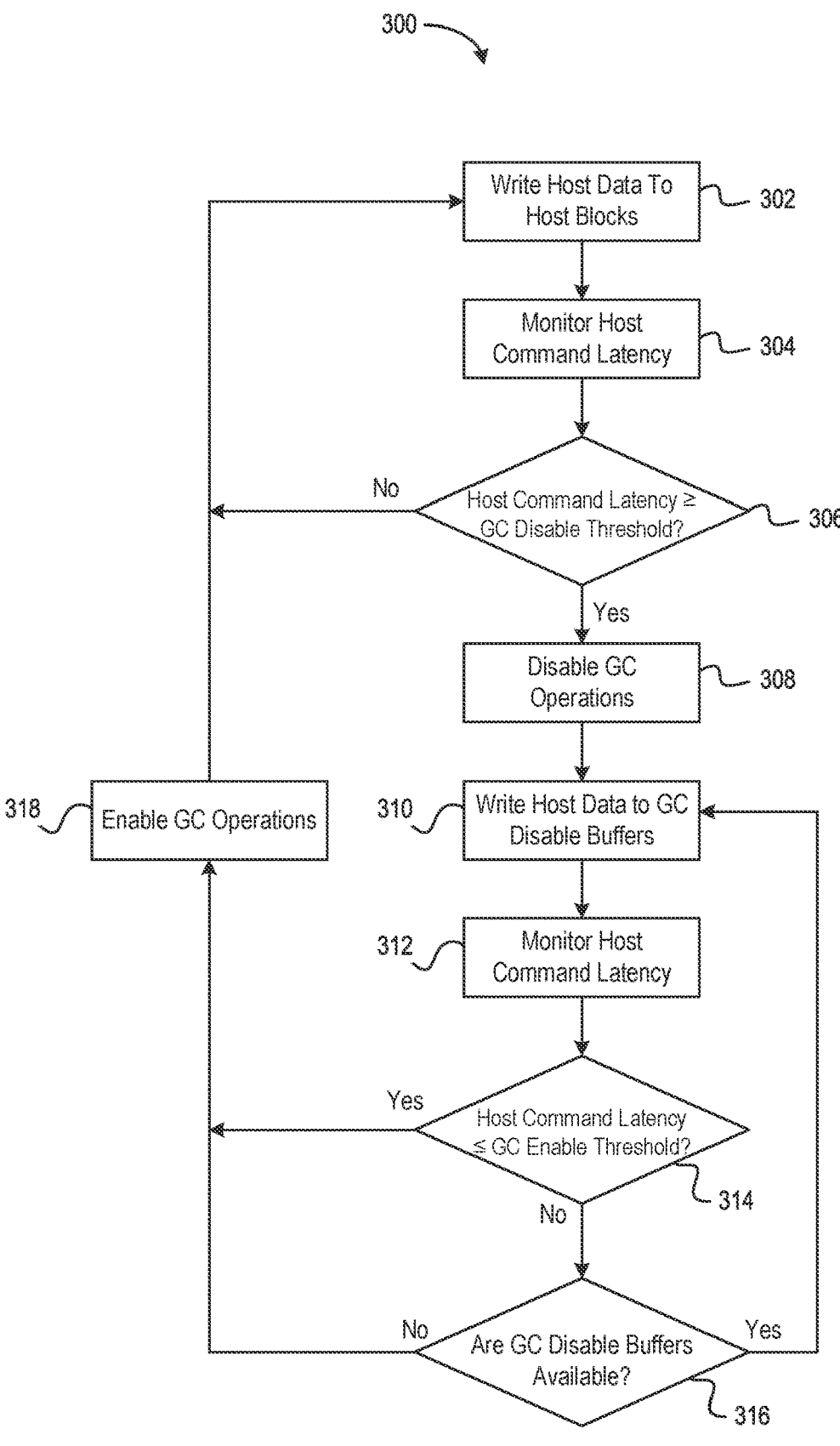
FIG. 3 is an example method of dynamically disabling GC operations, in accordance with some embodiments of the disclosure.

FIG. 3 provides a method 300 for dynamically disabling GC operations. The method 300 may be implemented by the electronic processor 128 using the GC thresholds 124, the host command submission queue 146, and the GC allowed flag 144. In embodiments described herein, the GC allowed flag 144 has a value of "1" to indicate that GC operations are enabled, and the GC allowed flag 144 has a value of "0" to indicate that GC operations are disabled. However, in some embodiments, the GC allowed flag 144 may have other values (binary or analog) to indicate whether GC operations are enabled or disabled.

The method 300 includes writing, with the electronic processor 128, host data to host blocks (at block 302). For example, host data from the host device 108 is received by the data storage device 102. The host data may be included in a host command received by the data storage device 102. As the host data is received, the host data is initially stored to the host command submission queue 146. The electronic processor 128 writes the host data to the host blocks 109A-109N and erases the host command from the host command submission queue 146. In some embodiments, while writing host data to host blocks, the GC allowed flag 144 is set to "1", and GC operations are therefore allowed. The method 300 includes monitoring, with the electronic processor 128, host command latency (at block 304). For example, the electronic processor 128 tracks the amount of time between receiving the host command from the host device 108 and storing the host data in the host blocks 109A-109N. As another example, the electronic processor 128 subtracts the timestamp of the submission of the host command to the host command submission queue 146 from the timestamp of the completion of the host command. In some embodiments, the electronic processor 128 tracks the host command latency by implementing a counter and/or a clock. The electronic processor 128 may increment the counter while performing the received host command. In such an implementation, the value of the counter at the time the host command is completed is the value of the host command latency. While illustrated sequentially, in some instances, the electronic processor 128 monitors the host command latency simultaneously with block 302. Additionally, in some instances, rather than tracking the latency of each individual host command, the electronic processor 128 may track a moving average of latency values for the previous N host commands.

The method 300 includes determining, with the electronic processor 128, whether the host command latency is greater than or equal to a GC disable threshold (at decision block 306). When the host command latency is not greater than or equal to the GC disable threshold ("NO" at decision block 306), the method 300 includes returning to block 302 and continues writing, with the electronic processor 128, host data to host blocks 109A-109N.

When the host command latency is greater than or equal to the GC disable threshold ("YES" at decision block 306), the method 300 includes disabling, with the electronic processor 128, GC operations (at block 308). For example, the electronic processor 128 may set the value of the GC allowed flag 144 to "0", thereby disabling GC operations. Accordingly, once the host command latency becomes too high, GC operations are disabled such that the data storage device 102 prioritizes storing new host data over relocating old host data. The method includes writing, with the electronic processor 128, host data to GC disable buffers (at block 310). For example, host data from the host device 108 is received by the data storage device 102. As the host data is received, the host data is initially stored to the host command submission queue 146. While GC operations are disabled, the electronic processor 128 writes the host data to the GC buffers 111A-111N and erases the host command from the host command submission queue 146.

The method 300 includes monitoring, with the electronic processor 128, host command latency (at block 312). For example, the electronic processor 128 tracks the amount of time between receiving the host data from the host device 108 and storing the host data in the GC buffers 111A-111N. While illustrated sequentially, in some instances, the electronic processor 128 monitors the host command latency simultaneously with block 310.

The method 300 includes determining, with the electronic processor 128, whether the host command latency is less than or equal to a GC enable threshold (at decision block 314). When the host command latency is less than or equal to the GC enable threshold ("YES" at decision block 314), the method 300 includes enabling, with the electronic processor 128, GC operations (at block 318). For example, the electronic processor 128 sets the value of the GC allowed flag 144 to "1", thereby enabling GC operations. Accordingly, once the host command latency has dropped back to normal operating levels, the data storage device 102 permits and performs GC operations. When GC operations are enabled, the method 300 returns to block 302 and continues writing, with the electronic processor 128, host data to host blocks.

When the host command latency is greater than the GC enable threshold ("NO" at decision block 314), the method 300 includes determining, with the electronic processor 128, whether additional GC disable buffers are available (at decision block 316). For example, the memory 104 may include a limited number of GC buffers 111A-111N. When additional GC disable buffers are available ("YES" at decision block 316), the method 300 returns to block 310 and continues writing, with the electronic processor 128, host data to GC disable buffers. When additional GC disable buffers are not available ("NO" at decision block 316), the method 300 includes enabling, with the electronic processor 128, GC operations (at block 318). For example, when the GC buffers 111A-111N are full, the electronic processor 128 enables GC operations to relocate old host data stored in the memory 104. After enabling GC operations, the method returns to block 302 and continues writing, with the electronic processor 128, host data to host blocks. Accordingly, when the GC buffers 111A-111N are fully utilized, the data storage device 102 returns to normal operation, including performing GC operations and writing host data to the host blocks 109A-109N.

In some instances, once the period of burst is completed (for example, the host command latency drops below the GC enable threshold at decision block 314), the electronic processor 128 transfers (e.g., relocates) host data from the GC buffers 111A-111N to the host blocks 109A-109N. Once the host data is transferred from the GC buffers 111A-111N to the host blocks 109A-109N, the host data is erased from the GC buffers 111A-111N, freeing the GC buffers 111A-111N for future use.

FIGS. 4A-4C illustrate one example of the method 300. FIG. 4A illustrates a graph of the observed host command latency over time. FIG. 4B illustrates a graph of the value of the GC allowed flag 144 over time. FIG. 4C illustrates a graph of available GC buffers 111A-111N over time.

From time t0 to time t1, the observed host command latency is below the GC disable threshold, and the data storage device 102 operates normally. Additionally, from time t0 to time t1, the GC allowed flag is set to "1" and all GC buffers 111A-111N are available. At time t1, the observed host command latency increases above the GC disable threshold. In response, the GC allowed flag is set to "0" to disable GC operations, and host data is stored to the GC buffers 111A-111N. Available GC buffers 111A-111N decreases from time t1 to time t2.

At time t2, the observed host command latency drops below the GC enable threshold, and the GC allowed flag is set to "1" to enable GC operations. From time t2 to time t3, the available GC buffers 111A-111N increases, as host data is moved from the GC buffers 111A-111N to the host blocks 109A-109N. At time t3, the observed host command latency increases above the GC disable threshold. In response, the GC allowed flag is set to "0" to disable GC operations, and host data is stored to the GC buffers 111A-111N. Available GC buffers 111A-111N decreases from time t3 to time t4. At time t4, the observed host command latency drops below the GC enable threshold, and the GC allowed flag is set to "1" to enable GC operations.

Figures 5A, 5B, 5C:
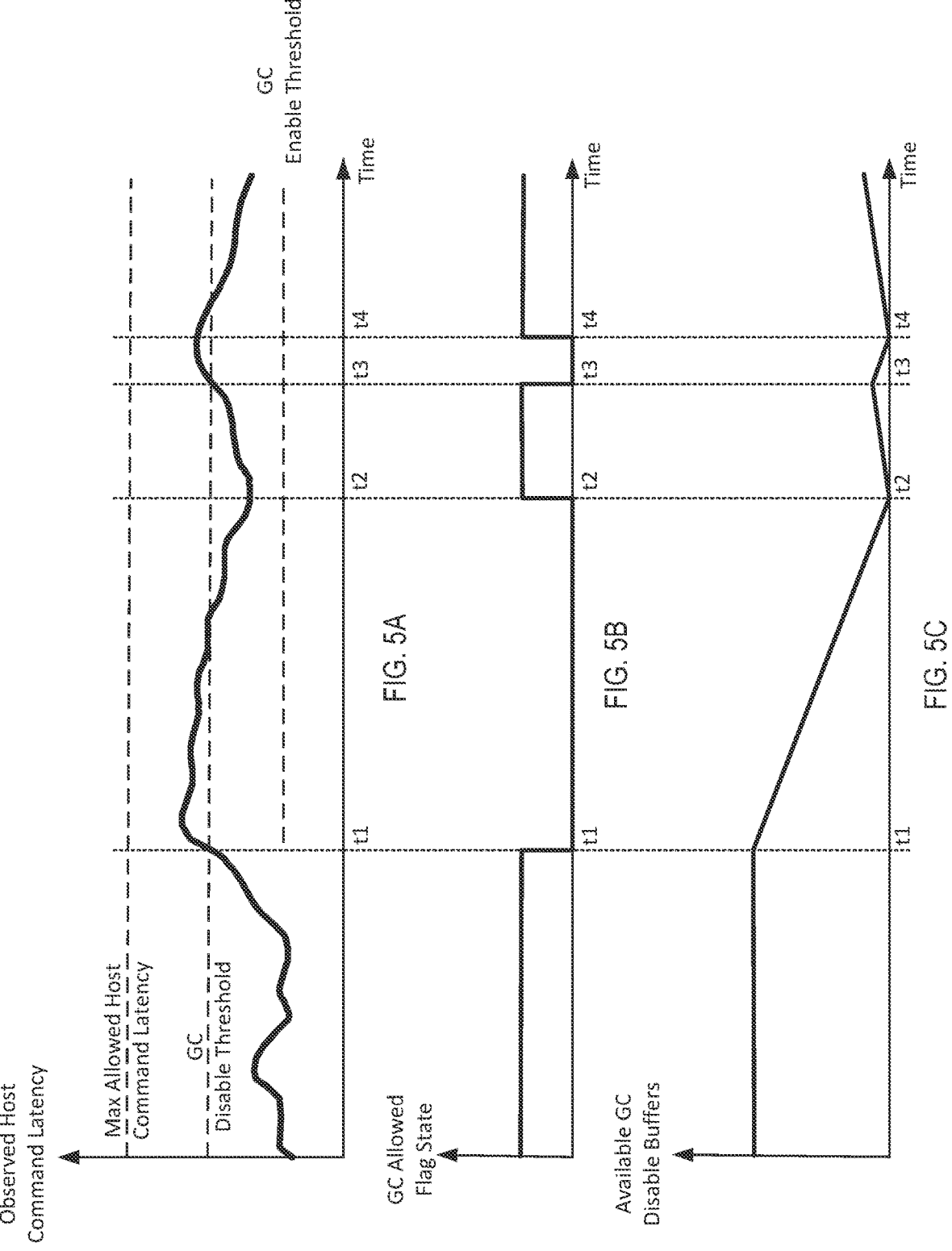
FIG. 5A is a graph illustrating host command latency over time, in accordance with another embodiment of the disclosure.
FIG. 5B is a graph illustrating a flag state associated with the graph of FIG. 5A.
FIG. 5C is a graph illustrating available buffers associated with the graph of FIG. 5A.

FIGS. 5A-5C illustrate another example of the method 500. FIG. 5A illustrates a graph of the observed host command latency over time. FIG. 5B illustrates a graph of the value of the GC allowed flag 144 over time. FIG. 5C illustrates a graph of available GC buffers 111A-111N over time.

From time t0 to time t1, the observed host command latency is below the GC disable threshold, and the data storage device 102 operates normally. Additionally, from time t0 to time t1, the GC allowed flag 144 is set to "1" and all GC buffers 111A-111N are available. At time t1, the observed host command latency increases above the GC disable threshold. In response, the GC allowed flag is set to "0" to disable GC operations, and host data is stored to the GC buffers 111A-111N. Available GC buffers 111A-111N decreases from time t1 to time t2.

At time t2, the number of available GC buffers 111A-111N hits 0, and no GC buffers 111A-111N are available. In response, the GC allowed flag 144 is set to "1" to enable GC operations. From time t2 to time t3, the observed host command latency is below the GC disable threshold and above the GC enable threshold. Additionally, from time t2 to time t3, the number of available GC buffers 111A-111N increases as host data is transferred from the GC buffers 111A-111N to the host blocks 109A-109N.

At time t3, the observed host command latency increases above the GC disable threshold. In response, the GC allowed flag is set to "0" to disable GC operations, and host data is stored to the GC buffers 111A-111N. Available GC buffers 111A-111N decreases from time t3 to time t4. At time t4, the number of available GC buffers 111A-111N hits 0, and no GC buffers 111A-111N are available. In response, the GC allowed flag 1 is set to "1" to enable GC operations.

The following are enumerated examples of the methods, devices, and apparatuses described herein. Example 1: a data storage device, comprising: a memory interface configured to interface with a non-volatile memory, the non-volatile memory including a plurality of memory blocks, and an electronic processor configured to: receive a host command including host data to store in the plurality of memory blocks, perform the host command, determine whether a host command latency is greater than or equal to a first threshold, and disable, when the host command latency is greater than or equal to the first threshold, garbage collection operations of the data storage device.

Example 2: The data storage device of Example 1, wherein the plurality of memory blocks includes a plurality of host blocks and a plurality of buffers, and wherein the electronic processor is configured to: write, when the host command latency is less than the first threshold, the host data to the plurality of host blocks, and write, when the host command latency is greater than or equal to the first threshold, the host data to the plurality of buffers.

Example 3: The data storage device of any of Examples 1 or 2, wherein the electronic processor is configured to disable garbage collection operations of the data storage device by setting a value of a flag associated with garbage collection operations.

Example 4: The data storage device of any of Examples 1 through 3, wherein the electronic processor is further configured to: determine whether the host command latency is less than or equal to a second threshold, and enable, when the host command latency is less than or equal to the second threshold, garbage collection operations of the data storage device.

Example 5: The data storage device of Example 4, wherein the plurality of memory blocks includes a plurality of host blocks and a plurality of buffers, and wherein the electronic processor is further configured to: write, when the host command latency is less than the second threshold, the host data to the plurality of host blocks, and write, when the host command latency is greater than or equal to the second threshold, the host data to the plurality of buffers.

Example 6: The data storage device of Example 4, wherein the plurality of memory blocks includes a plurality of host blocks and a plurality of buffers, and wherein the electronic processor is further configured to: determine, when the host command latency is greater than or equal to the second threshold, whether a buffer included in the plurality of buffers is available, and write, when the buffer included in the plurality of buffers is not available, the host data to the plurality of host blocks.

Example 7: The data storage device of Example 6, wherein the electronic processor is further configured to: write, when the buffer included in the plurality of buffers is available, the host data to the plurality of buffers.

Example 8: A method for dynamic garbage collection operations, the method comprising: receiving a host command including host data to store in a plurality of memory blocks of a data storage device, performing the host command, determining whether a host command latency is greater than or equal to a first threshold, and disabling, when the host command latency is greater than or equal to the first threshold, garbage collection operations of the data storage device.

Example 9: The method of Example 8, further comprising: writing, when the host command latency is less than the first threshold, the host data to a plurality of host blocks included in the plurality of memory blocks, and writing, when the host command latency is greater than or equal to the first threshold, the host data to a plurality of buffers included in the plurality of memory blocks.

Example 10: The method of Example 8 or 9, further comprising: determining whether the host command latency is less than or equal to a second threshold, and enabling, when the host command latency is less than or equal to the second threshold, garbage collection operations of the data storage device.

Example 11: The method of any of Examples 8 through 10, further comprising: determining whether the host command latency is less than or equal to a second threshold, and enabling, when the host command latency is less than or equal to the second threshold, garbage collection operations of the data storage device.

Example 12: The method of Example 11, further comprising: determining, when the host command latency is greater than or equal to the second threshold, whether a buffer included in the plurality of memory blocks is available, and writing, when the buffer included in the plurality of memory blocks is not available, the host data to a plurality of host blocks included in the plurality of memory blocks.

Example 13: The method of Example 11 or 12, further comprising: determining, when the host command latency is greater than or equal to the second threshold, whether a buffer included in the plurality of memory blocks is available, and writing, when the buffer included in the plurality of memory blocks is not available, the host data to a plurality of host blocks included in the plurality of memory blocks.

Example 14: The method of Example 13, further comprising: writing, when the buffer included in the plurality of buffers is available, the host data to the plurality of buffers.

Example 15: An apparatus comprising: means for interfacing with a non-volatile memory, the non-volatile memory including a plurality of memory blocks; means for receiving a host command including host data to store in the plurality of memory blocks; means for performing the host command; means for determining whether a host command latency is greater than or equal to a first threshold; and means for disabling, when the host command latency is greater than or equal to the first threshold, garbage collection operations.

Example 16: The apparatus of Example 15, further comprising: means for writing, when the host command latency is less than the first threshold, the host data to a plurality of host blocks included in the plurality of memory blocks; and means for writing, when the host command latency is greater than or equal to the first threshold, the host data to a plurality of buffers included in the plurality of memory blocks.

Example 17: The apparatus of Example 15 or 16, further comprising: means for setting a value of a flag associated with the garbage collection operations.

Example 18: The apparatus of any of Examples 15 through 17, further comprising: means for determining whether the host command latency is less than or equal to a second threshold; and means for enabling, when the host command latency is less than or equal to the second threshold, garbage collection operations of the data storage device.

Example 19: The apparatus of Example 18, further comprising: means for writing, when the host command latency is less than the second threshold, the host data to a plurality of host blocks included in the plurality of memory blocks, and means for writing, when the host command latency is greater than or equal to the second threshold, the host data to a plurality of buffers included in the plurality of memory blocks.

Example 20: The apparatus of Example 18 or 19, further comprising: means for determining, when the host command latency is greater than or equal to the second threshold, whether a buffer included in the plurality of memory blocks is available, and means for writing, when the buffer included in the plurality of memory blocks is not available, the host data to a plurality of host blocks included in the plurality of memory blocks.

Example 21: A data storage device, comprising: a memory interface configured to interface with a non-volatile memory, the non-volatile memory including a plurality of memory blocks, wherein the plurality of memory blocks includes a plurality of host blocks and a plurality of buffers, and an electronic processor configured to: receive a host command including host data to store in the plurality of memory blocks, determine whether a host command latency is greater than or equal to a first threshold, write, when the host command latency is less than the first threshold, the host data to the plurality of host blocks, and write, when the host command latency is greater than or equal to the first threshold, the host data to the plurality of buffers.

Example 22: The data storage device of Example 21, wherein the electronic processor is further configured to: disable, when the host command latency is greater than or equal to the first threshold, garbage collection operations of the data storage device.

Example 23: The data storage device of Example 22, wherein the electronic processor is configured to disable garbage collection operations of the data storage device by setting a value of a flag associated with garbage collection operations.

Example 24: The data storage device of any of Examples 21 through 23, wherein the electronic processor is further configured to: determine whether the host command latency is less than or equal to a second threshold, write, when the host command latency is less than the second threshold, the host data to the plurality of host blocks, and write, when the host command latency is greater than or equal to the second threshold, the host data to the plurality of buffers.

Example 25: The data storage device of Example 24, wherein the electronic processor is configured to determine whether the host command latency is less than or equal to the second threshold after the host command latency is greater than or equal to the first threshold.

Example 26: The data storage device of Example 24 or 25, wherein the electronic processor is further configured to: enable, when the host command latency is less than or equal to the second threshold, garbage collection operations of the data storage device.

Example 27: The data storage device of any of Examples 21 through 26, wherein the electronic processor is further configured to: determine whether a buffer included in the plurality of buffers is available, and write, when the buffer included in the plurality of buffers is not available, the host data to the plurality of host blocks.

Example 28: The data storage device of Example 27, wherein the electronic processor is configured to determine whether the buffer included in the plurality of buffers is available when the host command latency is greater than a second threshold.

Example 29: A method according to any one of Examples 21-28. Example 30: An apparatus according to any one of Examples 21-28.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
a memory interface configured to interface with a non-volatile memory, the non-volatile memory including a plurality of memory blocks, the plurality of memory blocks including a plurality of host blocks and a plurality of garbage collection buffers; and
an electronic processor configured to:
receive a host write command including host data to store in the plurality of memory blocks,
perform the host write command,
determine, while performing the host write command, whether a host write command latency is greater than or equal to a first threshold,
write, when the host write command latency is less than the first threshold, the host data to the plurality of host blocks; and
disable, when the host write command latency is greater than or equal to the first threshold, garbage collection operations of the data storage device,
wherein, while garbage collection operations are disabled, the electronic processor is configured to write the host data to the plurality of garbage collection buffers.

2. The data storage device of claim 1, wherein the electronic processor is configured to disable garbage collection operations of the data storage device by setting a value of a flag associated with garbage collection operations.

3. The data storage device of claim 1, wherein the electronic processor is further configured to:
determine whether the host write command latency is less than or equal to a second threshold, and
enable, when the host write command latency is less than or equal to the second threshold, garbage collection operations of the data storage device.

4. The data storage device of claim 3, wherein the electronic processor is further configured to:
write, when the host write command latency is less than the second threshold, the host data to the plurality of host blocks, and
write, when the host write command latency is greater than or equal to the second threshold, the host data to the plurality of garbage collection buffers.

5. The data storage device of claim 3, wherein the electronic processor is further configured to:
determine, when the host write command latency is greater than or equal to the second threshold, whether a garbage collection buffer included in the plurality of garbage collection buffers is available, and
write, when the garbage collection buffer included in the plurality of garbage collection buffers is not available, the host data to the plurality of host blocks.

6. The data storage device of claim 5, wherein the electronic processor is further configured to:
write, when the garbage collection buffer included in the plurality of garbage collection buffers is available, the host data to the plurality of garbage collection buffers.

7. A method for dynamic garbage collection operations, the method comprising:
receiving a host write command including host data to store in a plurality of memory blocks of a data storage device, wherein the plurality of memory blocks include a plurality of host blocks and a plurality of garbage collection buffers,
performing the host write command,
determining, while performing the host write command, whether a host write command latency is greater than or equal to a first threshold,
writing, when the host write command latency is less than the first threshold, the host data to the plurality of host blocks,
disabling, when the host write command latency is greater than or equal to the first threshold, garbage collection operations of the data storage device, and
writing, while the garbage collection operations are disabled, the host data to the plurality of garbage collection buffers.

8. The method of claim 7, wherein disabling garbage collection operations of the data storage device includes setting a value of a flag associated with garbage collection operations.

9. The method of claim 7, further comprising:

determining whether the host write command latency is less than or equal to a second threshold, and enabling, when the host write command latency is less than or equal to the second threshold, garbage collection operations of the data storage device.

10. The method of claim 9, further comprising:

writing, when the host write command latency is less than the second threshold, the host data to the plurality of host blocks included in the plurality of memory blocks, and writing, when the host write command latency is greater than or equal to the second threshold, the host data to the plurality of garbage collection buffers.

11. The method of claim 9, further comprising:

determining, when the host write command latency is greater than or equal to the second threshold, whether a garbage collection buffer included in the plurality of garbage collection buffers is available, and writing, when the garbage collection buffer included in the plurality of garbage collection buffers is not available, the host data to the plurality of host blocks.

12. The method of claim 11, further comprising:

writing, when the garbage collection buffer included in the plurality of garbage collection buffers is available, the host data to the plurality of garbage collection buffers.

13. An apparatus comprising:

means for interfacing with a non-volatile memory, the non-volatile memory including a plurality of memory blocks, the plurality of memory blocks including a plurality of host blocks and a plurality of garbage collection buffers;

means for receiving a host write command including host data to store in the plurality of memory blocks;

means for performing the host write command;

means for determining, while performing the host write command, whether a host write command latency is greater than or equal to a first threshold;

means for writing, when the host write command latency is less than the first threshold, the host data to the plurality of host blocks;

means for disabling, when the host write command latency is greater than or equal to the first threshold, garbage collection operations; and means for writing, while garbage collection operations are disabled, the host data to the plurality of garbage collection buffers.

14. The apparatus of claim 13, further comprising:

means for setting a value of a flag associated with the garbage collection operations.

15. The apparatus of claim 13, further comprising:

means for determining whether the host write command latency is less than or equal to a second threshold; and means for enabling, when the host write command latency is less than or equal to the second threshold, garbage collection operations.

16. The apparatus of claim 15, further comprising:

means for writing, when the host write command latency is less than the second threshold, the host data to the plurality of host blocks, and means for writing, when the host write command latency is greater than or equal to the second threshold, the host data to the plurality of garbage collection buffers.

17. The apparatus of claim 15, further comprising:

means for determining, when the host write command latency is greater than or equal to the second threshold, whether a garbage collection buffer included in the plurality of garbage collection buffers is available, and means for writing, when the garbage collection buffer included in the plurality of garbage collection buffers is not available, the host data to the plurality of host blocks.

* * * * *